(12) United States Patent
Wilson et al.

(10) Patent No.: US 10,754,317 B2
(45) Date of Patent: Aug. 25, 2020

(54) CONTROL OF AN ELECTRICAL POWER NETWORK

(71) Applicant: UK Grid Solutions Limited, Stafford (GB)

(72) Inventors: Douglas Wilson, Edinburgh (GB); Oleg Bagleybter, Edinburgh (GB); Sean Norris, Edinburgh (GB); Kyriaki Maleka, Edinburgh (GB)

(73) Assignee: UK Grid Solutions Limited, Stafford (GB)

( * ) Notice: Subject to any disclaimer, the term of this patent is extended or adjusted under 35 U.S.C. 154(b) by 0 days.

(21) Appl. No.: 15/570,251

(22) PCT Filed: Apr. 26, 2016

(86) PCT No.: PCT/GB2016/051259
§ 371 (c)(1),
(2) Date: Sep. 7, 2018

(87) PCT Pub. No.: WO2016/174476
PCT Pub. Date: Nov. 3, 2016

(65) Prior Publication Data
US 2019/0041815 A1    Feb. 7, 2019

(30) Foreign Application Priority Data

Apr. 29, 2015 (GB) .................................. 1507349.7

(51) Int. Cl.
*H02J 3/00* (2006.01)
*H02J 13/00* (2006.01)
*G05B 19/042* (2006.01)
*H02J 3/24* (2006.01)

(52) U.S. Cl.
CPC .............. *G05B 19/042* (2013.01); *H02J 3/00* (2013.01); *H02J 3/24* (2013.01); *H02J 13/0006* (2013.01);
(Continued)

(58) Field of Classification Search
CPC ... G05B 19/042; H02J 3/00; H02J 3/24; H02J 13/0006; Y02B 70/3216; Y02B 70/3225
See application file for complete search history.

(56) References Cited

U.S. PATENT DOCUMENTS

| 2009/0076745 A1 | 3/2009 | Sakashita et al. |
| 2010/0088261 A1* | 4/2010 | Montalvo ................ H02J 3/14 706/15 |

(Continued)

FOREIGN PATENT DOCUMENTS

| EP | 1780858 A1 | 5/2007 |
| JP | 2014090665 | 5/2014 |

(Continued)

OTHER PUBLICATIONS

International Search Report and Written Opinion issued in connection with corresponding PCT application No. PCT/US2016/051259 dated Dec. 5, 2016.

*Primary Examiner* — Mark A Connolly
(74) *Attorney, Agent, or Firm* — Fitch Even Tabin & Flannery LLP

(57) ABSTRACT

A method of controlling an electrical power network in which a sudden event which may lead to loss or excess of generation or load. The electrical power network comprises plural controllers, each controller configured to control an apparatus connected to the power network at a different respective location in the electrical power network. The method comprises determining the occurrence of the sudden and receiving synchronised quantities in each of the controllers each of the quantities corresponding to one of frequency and angle at respective different locations in the electrical power network. The method further comprises generating a control output from each controllers in dependence on the received plural quantities, each control output controlling its respective apparatus, each controller gener- (Continued)

ating the control output independent of operation of any other controller and on an ongoing basis in dependence on ongoing receipt of the plural quantities.

29 Claims, 9 Drawing Sheets

(52) U.S. Cl.
CPC ....... *G05B 2219/2639* (2013.01); *H02J 3/001* (2020.01); *H02J 2203/20* (2020.01); *Y02B 70/3216* (2013.01); *Y02E 60/76* (2013.01); *Y04S 10/525* (2013.01); *Y04S 20/221* (2013.01); *Y04S 40/22* (2013.01)

(56) References Cited

U.S. PATENT DOCUMENTS

| 2010/0109447 | A1 | 5/2010 | Achilles et al. | |
|---|---|---|---|---|
| 2010/0217550 | A1* | 8/2010 | Crabtree | H02J 3/005 702/62 |
| 2010/0292856 | A1* | 11/2010 | Fujita | G06Q 10/04 700/291 |
| 2011/0273019 | A1* | 11/2011 | de Caires | H02J 7/35 307/66 |
| 2011/0276194 | A1* | 11/2011 | Emalfarb | H02J 3/32 700/297 |
| 2012/0248772 | A1 | 10/2012 | Shigemizu | |
| 2013/0099582 | A1 | 4/2013 | Ray et al. | |
| 2013/0234680 | A1 | 9/2013 | Kolwalkar | |
| 2014/0246925 | A1* | 9/2014 | Porter | H02J 3/14 307/115 |
| 2015/0323575 | A1* | 11/2015 | Chanedeau | G01R 19/2513 702/75 |
| 2017/0033408 | A1* | 2/2017 | O'Hora | H01M 10/425 |

FOREIGN PATENT DOCUMENTS

| WO | 2012137356 | | 10/2012 |
|---|---|---|---|
| WO | 2013132872 | | 9/2013 |
| WO | 2014132081 | A1 | 9/2014 |
| WO | 2015037654 | | 3/2015 |

* cited by examiner

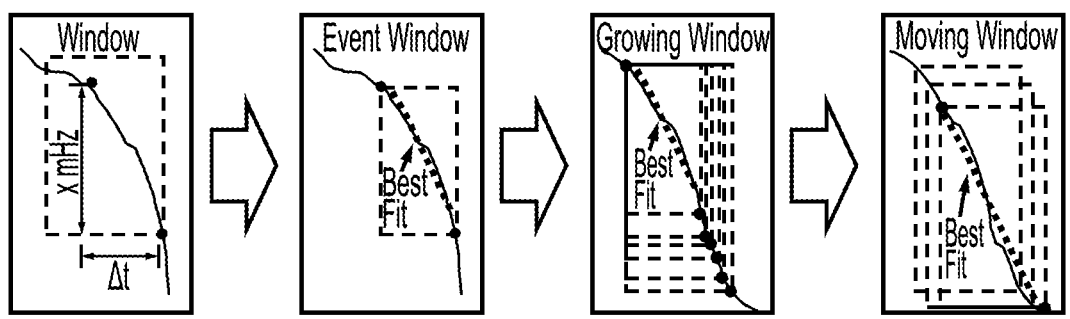
*Fig. 11A*  *Fig. 11B*  *Fig. 11C*  *Fig. 11D*

CONTROL OF AN ELECTRICAL POWER NETWORK

FIELD OF THE INVENTION

The present invention relates to a method of controlling an electrical power network in dependence on a sudden event, such as loss of transmission line, generator or load, which is liable to lead to further loss or excess of generation or load within the electrical power network or part of the electrical power network. The present invention also relates to apparatus for controlling an electrical power network in dependence on a sudden event which is liable to lead to further loss or excess of generation or load within the electrical power network or part of the electrical power network. The present invention further relates to an electrical power network configured for control in dependence on a sudden event which is liable to lead to further loss or excess of generation or load within the electrical power network or part of the electrical power network.

BACKGROUND ART

Electrical power networks are liable to cascading outages and blackouts as a consequence of stability problems. Large, widely geographically distributed electrical power networks can, in certain circumstances, be more prone to stability problems, although it should be appreciated that problems can arise in electrical power networks of more modest size. Furthermore the ever increasing use of renewable generation reduces inertia within an electrical power network and thereby increases liability to outages and blackout.

It has long been known to use distributed control approaches to mitigate the consequences of stability problems. Such distributed control approaches involve local control, such as governor-frequency response and under-frequency load shedding, in dependence on local measurements. However such distributed control approaches are becoming too slow to react to electrical power network disturbances or they react disproportionately. Local distributed control involves an inherent delay by setting thresholds that discriminate between local effects and events affecting the wider electrical power network. Furthermore such distributed control approaches are often incapable of operating to advantage with fast acting control apparatus such as more recently developed power electronics.

It is also known to use System Integrity Protection Schemes (SIPS) to mitigate the consequences of stability problems. SIPS comprise a range of protection schemes which are operative to initiate at least one of controlled generation and load tripping in dependence on network faults which would otherwise lead to problems such as loss of synchronism, cascading outages and blackout. SIPS may take the form of relatively simple inter-tripping between network circuits and generators through to taking account of complex logical combinations of events configured for specific operating scenarios. The performance of SIPS is recognised as being mixed. SIPS involve effecting control in dependence on pre-programmed contingencies whereas actual electrical power network disturbances involve complex sequences of events and uncertain dynamic responses. SIPS are therefore liable to respond incorrectly to disturbances under certain circumstances and thereby allow greater problems to develop. SIPS are configured to over-respond to disturbances and thereby incur greater cost. Furthermore over-response may result in the electrical power network experiencing disturbance from the SIPS response in addition to the disturbance from the initial event that gave rise to the SIPS response. A further shortcoming is the centralised nature of SIPS. Centralised systems are liable to single point failure. The deployment of plural SIPS may address the problem of single point failure. However unanticipated interaction between plural SIPS during a disturbance is not unknown.

The present inventors have become appreciative of the above mentioned shortcomings of known approaches to control of an electrical power network with embodiments of the present invention having been devised in light of this appreciation. It is therefore an object of an embodiment of the present invention to provide an improved method of controlling an electrical power network in dependence on a sudden event, such as loss of transmission line, generator or load, which is liable to lead to further loss or excess of generation or load within the electrical power network or part of the electrical power network.

It is a further object of an embodiment of the present invention to provide improved apparatus for controlling an electrical power network in dependence on a sudden event which is liable to lead to further loss or excess of generation or load within the electrical power network or part of the electrical power network.

It is a yet further object of an embodiment of the present invention to provide an improved electrical power network configured for control in dependence on a sudden event which is liable to lead to further loss or excess of generation or load within the electrical power network or part of the electrical power network.

SUMMARY OF INVENTION

According to a first aspect of the present invention there is provided a method of controlling an electrical power network in dependence on a sudden event which is liable to lead to further loss or excess of generation or load, the electrical power network comprising plural controllers with each controller being configured to provide for control of controllable apparatus connected to the electrical power network at a different respective location in the electrical power network, the method comprising: determining the occurrence of a sudden event that is liable to lead to further loss or excess of generation or load in the electrical power network or part of the electrical power network; receiving plural substantially synchronised quantities in each of the plural controllers, each of the plural quantities corresponding to at least one of frequency and angle at a respective one of plural different locations in the electrical power network; and generating a control output from each of the controllers in dependence on the received plural quantities, each control output being for control of its respective controllable apparatus, each controller being operative to generate the control output independent of operation of any other controller and on an ongoing basis in dependence on ongoing receipt of the plural quantities.

According to the method of an embodiment of the present invention an electrical power network is controlled in dependence on a sudden event which is liable to lead to further loss or excess of generation or load. Loss or excess of generation or load may lead to problems of the kind described above, i.e. outages and blackouts, and therefore rebalancing of load and generation by way of an embodiment of the present invention is desirable to obviate such problems and more specifically at least limit loss of generation or load if not substantially prevent such loss. The sudden event may comprise at least one of: loss of a generator; loss of a load;

and transmission line loss. Such a sudden event is liable to lead to further loss or excess of generation or load. A sudden event according to an embodiment of the present invention typically involves loss of continuity of supply and may be contrasted with slower events involving no such loss of continuity but rather steady state control, such as load/generator balancing, active power control, stabilisation of oscillation, for example, of oscillation in frequency.

The electrical power network according to the method comprises plural controllers with each controller being configured to provide for control of controllable apparatus connected to the electrical power network at a different respective location in the electrical power network. The different locations in the electrical power network may be in different respective areas of the electrical power network. An area in the context of an embodiment of the present invention may comprise at least one of generation and load which is sufficiently strongly coupled that separation is unlikely. Areas may be separated from each other by transmission boundaries.

The method comprises determining the occurrence of a sudden event which may be of the form described above and which is liable to lead to further loss or excess of generation or load in the electrical power network or in a part of the electrical power network. In certain circumstances the sudden event may involve transmission line loss that leads to an area having a power imbalance too great to be accommodated by a transmission corridor connecting the area with another area. Thereupon plural substantially synchronised quantities are received in each of the plural controllers with the plural quantities corresponding to at least one of frequency and angle and more specifically voltage phase angle at a respective one of plural different locations in the electrical power network. A quantity corresponding to frequency may be rate of change of frequency as described in more detail below. A quantity corresponding to angle may be change in angle from before the sudden event as described in more detail below. More specifically the plural quantities may correspond to frequency and angle at each of plural different locations in the electrical power network. A received quantity, such as a quantity corresponding to frequency, may be based on aggregation of further corresponding quantities. Such a quantity may be received from aggregating apparatus operative to aggregate quantities in a particular area. The controller receiving the aggregated quantity may therefore be capable of responding appropriately to circumstances in the particular area in which it is comprised having regard to circumstances of the electrical power network as a whole. At least one of the plural substantially synchronised quantities may correspond further to at least one of frequency and angle to at least one of voltage phasors; current phasors; active power; and reactive power. Alternatively or in addition at least one of the plural substantially synchronised quantities may further comprise at least one of: voltage magnitude; current phase angle; and current magnitude. At least one quantity may be provided by way of a Phasor Measurement Unit (PMU). The different locations in the electrical power network from which the quantities originate may be in different respective areas of the electrical power network. More specifically at least one location from which a quantity originates may be the same as a location in the electrical power network of a controller. Measurement and control may therefore take place at substantially the same location.

The method further comprises generating a control output from each of the controllers in dependence on the received plural quantities with each control output being for control of its respective controllable apparatus. Furthermore each controller is operative to generate the control output independent of operation of any other controller and on an ongoing basis in dependence on ongoing receipt of the plural quantities. Further to plural substantially synchronised quantities being received in each controller at the outset, each controller may be operative independent of operation of any other controller. More specifically each controller may be operative to generate the control output without being dependant on a signal received from another one of the plural controllers. Each controller may therefore be operative without direct interaction with any other controller. Nevertheless the controllers may be operative in dependence on signals received from a central controller. As described elsewhere herein a central controller may be operative to provide for coordination and exert supervisory control. More specifically the method may comprise receiving data, such as configuration data, in each controller from the central controller. This step may be carried out before the step of determining the occurrence of a sudden event. Alternatively or in addition this step may be carried out on at least one occasion and more specifically before the step of determining the occurrence of a sudden event. Nevertheless it should be appreciated that the control output is generated by a controller independent of operation of any other controller as defined above irrespective of reception of such data from a central controller. More specifically the steps of determining the occurrence of a sudden event and generating a control output in dependence on the received plural quantities are carried out without communication with any other controller or the central controller.

Despite there being no direct interaction between controllers there may be indirect interaction between controllers such as by way of common or consequential response to a condition of the electrical power network which may have been influenced by action of one or more controllers. By way of further example indirect interaction may be by way of signals received by the controllers from the central controller. Further to independent operation of each controller, each controller is operative to generate a control output on an ongoing basis in dependence on ongoing receipt of the plural quantities. Thus the method may comprise providing further plural quantities in dependence on ongoing measurements, the further plural quantities being received in each controller. Therefore and according to an embodiment of the invention there may be plural feedback loops with a controller comprised in each feedback loop. Each controller may therefore be capable of independent control which therefore may provide for an adaptive, proportionate and rapid response to a sudden event which capability has been lacking from prior art approaches. The method therefore provides for network wide response and control whilst allowing individual controllers to respond on an autonomous basis. Furthermore the distributed nature of the method according to an embodiment of the present invention provides for at least a reasonable measure of accommodation of single point failure. In addition the method allows for reduced flow of data across apparatus involved in the method whereby response time may be reduced.

The step of determining the occurrence of a sudden event which is liable to lead to further loss or excess of generation or load in the electrical power network may comprise analysing plural quantities corresponding to at least one of frequency and angle at each of the different locations in the electrical power network. The step of determining the occurrence of a sudden event may be carried out in dependence on the plural quantities (i.e. wide area quantities) in particular to at least one local quantity as described hereinbelow. Relying on the plural quantities from the different locations in this fashion may provide for proper detection of wide area sudden events. Furthermore use of the plural quantities for sudden event occurrence determination provides for prompt determination. This approach, i.e. use of the plural quantities particular to at least one local quantity, may be of particular advantage where there is low inertia, such as may arise where there is renewable generation comprised in the electrical power network. However in the absence of the plural quantities, the determination may be made in dependence on at least one local quantity. Each of the plural controllers may be operative of itself to determine the occurrence of a sudden event.

A controller may be operative to determine if a sudden event has a rate of change, such as in respect of frequency, greater than a predetermined value. For example for the UK and where rate of change is being considered the predetermined value might be 0.2 Hz per second. More specifically the controller may be operative to apply a moving window approach whereby previous event values are taken into account. The window may be of changing width and more specifically of increasing width. For example the window may have an initial width, may then increase in width until a threshold width is reached and thereafter may be of substantially constant width.

Operation in dependence on the plural quantities may be impracticable or perhaps even impossible. For example communication may be lost whereby the plural quantities, such as in respect of one or more measurement locations, cannot be received in a controller. By way of further example there may be insufficient benefit to merit the bandwidth required for communication of the plural quantities to at least one controller. Operation may therefore be in dependence on at least one local quantity such as frequency instead of the plural quantities. Operation may be in respect of at least one of: the step of determination of the occurrence of a sudden event; and generating a control output from a controller. The method may therefore comprise determining whether or not at least one of the plural quantities is present at a controller. Alternatively or in addition the method may comprise determining whether or not at least one of the plural quantities reflects lack of measured signal availability from the location of measurement. For example, one of the plural quantities may have a null value which reflects lack of measurement at the location of measurement or lack of communication of measurement from the location of measurement. Alternatively or in addition the method may further comprise analysing plural quantities received in a controller. More specifically the method may comprise determining that operation is in dependence on at least one local quantity in dependence on the analysis. Furthermore the method may comprise changing a configuration of the controller whereby determination of occurrence of the sudden event is in dependence on at least one local signal. Alternatively or in addition, the method may comprise changing a configuration of the controller whereby the control signal is generated in dependence on at least one local signal. The method may comprise such operation in dependence on the at least one local quantity in respect of one controller, some controllers or perhaps even all of the plural controllers. A local quantity may be filtered to attenuate noise, disturbances and oscillations. Such filtering may introduce a delay whereby operation in dependence on at least one local quantity may be slower than operation in dependence on the plural quantities.

A controller may be operative to monitor for a fault in apparatus operating according to an embodiment of the invention. Typically a fault may be reflected by a large voltage drop and increase in frequency. The controller may be configured to detect such a fault. More specifically the controller may be configured not to determine whether or not there is a sudden event in dependence on detection of a fault. Following detection of a fault the controller may be operative to resume determination of whether or not there is a sudden event after a period of time and more specifically a set period of time. Such a period of time should suffice for fault measurements to propagate properly through apparatus operating according to an embodiment of the invention and for accelerating apparatus to slow down. The period of time may, for example, be set at between 20 ms and 40 ms. Alternatively or in addition, the period of time may be changed. The period of time may depend on determined fault characteristics.

A controller may be operative to generate the control output in dependence on at least one local quantity in addition to the received plural quantities, the local quantity corresponding to frequency at the same location as the controller. The at least one local quantity may further correspond to at least one of voltage phasors and current phasors at the same location as the controller. The controller may be configured to provide the control output in dependence on the received plural quantities and the at least one local quantity.

A controller may be configured to generate the control output in dependence on the proportion of maximum available power of resource, such as generation, local to the controller and maximum available power from the area comprising the controller. Apparatus according to an embodiment of the present invention may therefore comprise a central controller which is configured to convey data to such end to the controllers. The central controller may be further configured to receive data from controllers and perhaps also carry out computation on received data before data is conveyed to controllers. A controller may be configured to take response capacity of each of the plural areas comprised in the electrical power network into account. Such area data may be received in the central controller for computation thereon. Alternatively or in addition the controller may be configured to take operational requirements of the electrical power network into account. Circumstances may change over time such as in respect of the identity of the largest generation unit or the estimated inertia. The controller may therefore be configured to take the like of response capacity and operational requirements into account on an ongoing basis. Alternatively or in addition, the controller may be configured to generate the control output in dependence on a difference between change in area angle or a quantity corresponding thereto, such as frequency, from the pre-event state and change in system angle or a quantity corresponding thereto, such as frequency, from the pre-event state. Alternatively or in addition, the controller may be configured to generate the control output in dependence on at least one of system frequency and rate of change of system frequency. System frequency may be determined in dependence on aggregation of plural quantities corresponding to frequency, each of the plural quantities being based on measurement made at a different location in the electrical power network. Aggregation may be in plural stages. For example the electrical power network may comprise plural area aggregators with each area aggregator being operative to aggregate plural quantities based on measurements in an area of the electrical power network comprising the area aggregator. Thereafter the aggregated quantities from the plural area aggregators may themselves be aggregated to provide the system frequency. More specifically the control output may be generated in dependence on system inertia further to at least one of system frequency and rate of change of system frequency. The system inertia may be estimated. Alternatively or in addition, the system inertia may be stored in a central processor comprised in the electrical power network and conveyed therefrom to the controller.

A controller may be operative to determine occurrence of an event within the electrical power network in dependence on the received plural quantities. The controller may be operative to determine in dependence on the received plural quantities at least one of: a change in a quantity, such as system frequency; a spread of quantities, such as of frequencies; and a change in loadflow behaviour. Where the controller is operative to determine at least one of a change in a quantity and a change in loadflow behaviour, the change may be compared with a threshold value. Determination of occurrence of the event may be in dependence on the comparison. Operation of the controller in respect of further steps of the method may be conditional on determination of occurrence of the event.

Control of the controllable apparatus in dependence on the control output may be in dependence on a nature of the controllable apparatus. More specifically, one of three forms of control may be selected. The three forms of control may comprise: immediate triggering, such as breaker opening; continuous response, such as of a variable speed drive; and delayed response, such as generator or load ramping.

A controller may be operative to generate the control output in dependence on an event quantity in addition to the received plural quantities. The event quantity may be provided in dependence on a characteristic and behaviour of apparatus, such as controllable apparatus, comprised in the electrical power network.

A controller may be operative to provide controlling action in plural stages. A controlling action comprising plural stages may be effected in preference to a single stage in dependence on level of response required. More specifically a first stage may comprise control of fast responding controllable apparatus, such as load shedding. A second subsequent stage may comprise control of slower responding controllable apparatus, such as generation or load ramping.

A control output may be generated by a controller in dependence on the received plural quantities. The control output may be generated further in dependence on at least one of: an event occurrence; a local quantity; and an event quantity. The control target may comprise a control target quantity. The control target quantity may be changed so as to be of increasing effect until sufficient response of the electrical power network is achieved as determined by further plural quantities received on an ongoing basis.

As described above, a controller may be operative to generate a control output in dependence on at least one local signal such as frequency. More specifically the controller may be operative on the at least one local signal to the exclusion of the plural quantities. The controller may be configured such that control in dependence on at least one local signal and without the plural quantities may take place subsequent to control in dependence on the plural quantities. As described elsewhere herein such local signal control may be slower in nature than control based on the plural quantities. Thus local signal control may be appropriate for a sustaining phase of response subsequent to an initial fast phase of response based on the plural quantities.

Where control is in dependence on at least one local signal, the control output may depend on a rate of change of local frequency. Alternatively or in addition, the control output may depend on a constant derived from a worst case rate of change of local frequency to which the controllable apparatus should respond. Alternatively or in addition, the control output may depend on the maximum available power of the controllable apparatus. Alternatively, or in addition, the control output may have one of plural levels selected in dependence on comparison of frequency with each of plural different threshold values. Alternatively, or in addition, the control output may have one of plural levels selected in dependence on comparison of rate of change of local frequency with each of plural different threshold values. For example a first lower level of control output may be selected when frequency is below a first lower threshold value and a second higher level of control output may be selected when the frequency is below a second higher threshold value.

A sudden event may occur when the electrical power network is intact or when the electrical power network is in an islanded state. Furthermore, the sudden event may occur when the electrical power network is intact but may result in the electrical power network becoming islanded. The relationship between rate of change of frequency and the power required from frequency response is different from the intact state when in an islanded state. The method of controlling an electrical power network may therefore further comprise an islanding detection method.

The islanding detection method may comprise at least one of: detection of a present islanded state; and detection of an impending islanded state. Detection of a present islanded state may comprise comparing measured frequency values of different parts of the electrical power network and determining a state of islanding in dependence on for example frequency of crossing of each other of measured frequency values. Alternatively or in addition detection of a present islanded state may comprise determining which parts are within the same island in dependence on for example frequency of crossing of each other of measured frequency values. More specifically a higher rate of crossing of measured frequency values from parts of the electrical power network indicate connection of these parts and a lower rate of crossing of measured frequency values from parts of the electrical power network indicate these parts are disconnected, i.e. islanded. Detection of an impending islanded state may comprise projecting a current measured angle difference between parts of the electrical power network forward in time using frequency difference. In addition the projected angle difference may be compared with a predetermined threshold value of angle difference. If the projected absolute angle difference is greater than the predetermined threshold value the parts are heading towards disconnection.

Following detection of one of a present islanded state and detection of an impending islanded state, the method of controlling an electrical power network may further comprise identifying the parts of the electrical power network that are connected and more specifically the parts that are synchronously connected with a local controller. The method may yet further comprise excluding signals which are not synchronous with at least one of: the local controller's own measurement; and the part of the electrical power network to which the local controller belongs. The rate of change of frequency for the electrical power network may therefore be determined in respect of the connected parts of the electrical power network.

Alternatively or in addition, at least one of a nature of a power response to the sudden event and rate of change of frequency for the electrical power network may be changed in dependence on detection of one of a present islanded state and detection of an impending islanded state. More specifically a factor used in respect of the intact electrical power network may be reduced by the proportion of inertia of the connected parts relative to the whole electrical power network.

Alternatively or in addition, where one of a present islanded state and detection of an impending islanded state is detected a local controller may be operative such that resources in a disconnected part of the electrical power network are not taken into account.

The received plural quantities may be substantially synchronised by synchronisation of apparatus operative to make measurements at the different locations or signals from such apparatus. For example and where PMUs are operative to make measurements, one of the PMUs and the signals therefrom may be substantially synchronised whereby the plural quantities may be substantially synchronised. For example PMUs may be synchronised by way of a time stamp such as a GPS time stamp. Plural quantities received on an ongoing basis may thus be substantially synchronised.

According to a second aspect of the present invention there is provided apparatus for controlling an electrical power network in dependence on a sudden event which is liable to lead to further loss or excess of generation or load, the apparatus comprising: an arrangement which is configured to determine the occurrence of a sudden event that is liable to lead to further loss or excess of generation or load in the electrical power network or a part of the electrical power network; plural controllers with each controller being configured to provide for control of controllable apparatus connected to the electrical power network at a different respective location in the electrical power network in dependence on plural substantially synchronised quantities being received in each of the plural controllers with each of the plural quantities corresponding to at least one of frequency and angle at a respective one of plural different locations in the electrical power network, control of the controllable apparatus being by way of a control output generated by each controller in dependence on the received plural quantities, each control output being for control of its respective controllable apparatus and each controller being operative to generate the control output independent of operation of any other controller and on an ongoing basis in dependence on ongoing receipt of the plural quantities.

Further embodiments of the second aspect of the present invention may comprise one or more features of the first aspect of the present invention.

According to a third aspect of the present invention there is provided an electrical power network comprising at least one apparatus according to the second aspect of the present invention.

Embodiments of the third aspect of the present invention may comprise one or more features of the first or second aspect of the present invention.

According to a further aspect of the present invention there is provided a method of controlling an electrical power network, the electrical power network comprising plural controllers with each controller being configured to provide for control of controllable apparatus connected to the electrical power network at a different respective location in the electrical power network, the method comprising: receiving at least one quantity in each of the plural controllers, the at least one quantity corresponding to one of an electrical and a mechanical measurement made at a location in the electrical power network; and generating a control output from each of the controllers in dependence on the received at least one quantity, each control output being for control of its respective controllable apparatus.

Embodiments of the further aspect of the present invention may comprise one or more features of any previous aspect of the present invention.

According to a further aspect of the present invention there is provided apparatus for controlling an electrical power network, the apparatus comprising: plural controllers with each controller being configured to provide for control of controllable apparatus connected to the electrical power network at a different respective location in the electrical power network, the apparatus being configured such that at least one quantity is received in each of the plural controllers, the at least one quantity corresponding to one of an electrical and a mechanical measurement made at a location in the electrical power network, each controller being configured to generate a control output in dependence on the received at least one quantity, each control output being for control of its respective controllable apparatus.

Embodiments of the yet further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which:

FIGS. 11A to 11D illustrate application of windows to event detection and to determination of rate of change of frequency.

DESCRIPTION OF EMBODIMENTS

Figure 1:
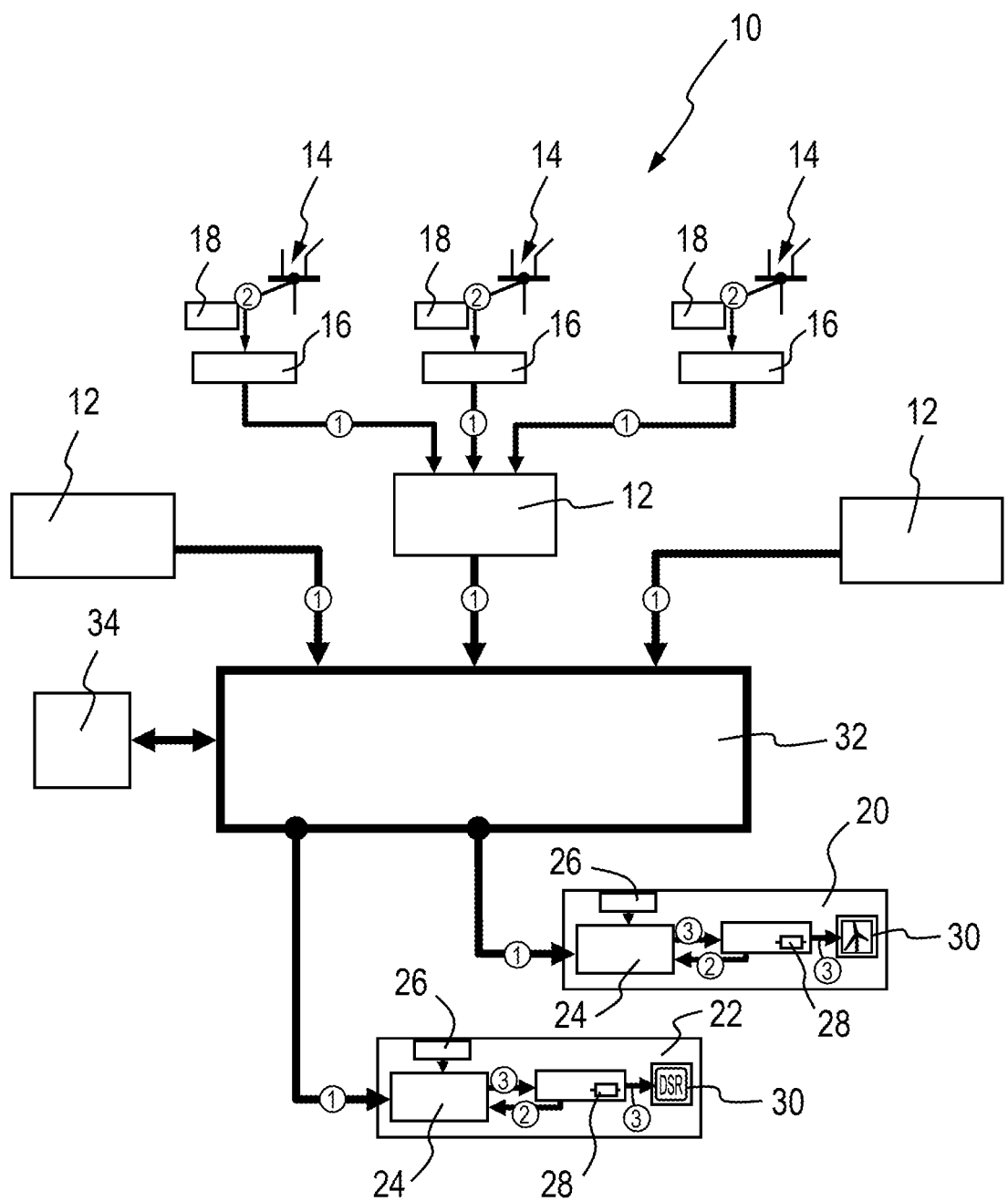
FIG. 1 is a block diagram representation of apparatus.

A block diagram representation of an apparatus is shown in FIG. 1. FIG. 1 represents three areas of an electrical power network 10 comprising three regional aggregators 12 with each regional aggregator receiving measurements made in a respective one of the three areas comprised in the electrical power network 10 shown in FIG. 1. Within an area there are plural substations 14. A Phasor Measurement Unit (PMU) 16 is present at each of the plural substations 14. Each PMU 16 is operative to measure frequency and voltage phase angle 18 at its respective substation 14. The PMUs 16 provide for synchronisation of measurements by way of a GPS time stamp. The measurements made by the PMUs 16 in an area are received in the regional aggregator 12 with the plural frequency and voltage phase angle measurements being aggregated therein. The apparatus further comprises first and second distributed control apparatus 20, 22. Each of the first and second distributed control apparatus 20, 22 comprises a controller 24, a PMU 26, a control interface 28 and controllable apparatus 30. In the first distributed control apparatus 20 the controllable apparatus 30 is a wind powered generator. In the second distributed control apparatus 22 the controllable apparatus 30 is Demand Side Response (DSR) apparatus. The apparatus further comprises a virtual local area network (vLAN) 32 which provides for communication between the regional aggregators 12 and the first and second distributed control apparatus 20, 22. The vLAN 32 is operative in accordance with the IEEE C37.118 PMU Protocol.

Considering the first and second distributed control apparatus 20, 22 further, the controller 24 receives data by way of the vLAN 32 and measurements made by the local PMU 26. Each of the first and second distributed control apparatus 20, 22 therefore receives aggregated forms of the measurements, such as an average of the actual measurements, made within the areas shown in FIG. 1 following aggregation by the regional aggregators 12 and indeed yet further areas as described below whereby each distributed control apparatus 20, 22 is operative in dependence on wide area measurements. Each of the first and second distributed control apparatus 20, 22 also receives local measurements from the local PMU 26 and is thus operative in dependence on the local measurements as well as the wide area measurements. The controller 24 is operative to generate a control signal which is received by the control interface 28. The control interface 28 is operative to control the controllable apparatus 30 on the basis of the received control signal and is also operative to transmit to the controller 24 data relating to the status and operation of the controllable apparatus 30. Communication of data between the controller 24 and the control interface 28 and the control interface 28 and the controllable apparatus 30 is in accordance with the IEC 61850 GOOSE protocol. Alternatively, or in addition, where legacy equipment is present additional protocols may be used to control such legacy equipment. The creation of such additional protocols will be within the ordinary design capabilities of the person skilled in the art who is familiar with such legacy equipment.

As stated above, FIG. 1 shows three areas of an electrical power network. Although not shown in FIG. 1, the electrical power network comprises yet further areas which are of the same form and function as the areas shown in FIG. 1. Each further area thus comprises a regional aggregator 12. The apparatus further comprises a central controller 34 which is configured for communication with the areas shown in FIG. 1 and the yet further areas. More specifically the central controller 34 is configured and operative to provide for communication with the regional aggregators 12 in the various areas of the electrical power network. The central controller 34 is operative to provide for supervisory and coordinating action comprising collection and distribution of measurements to the plural areas as described further below. It is to be noted that no controller 24 is dependent on the central controller 34 for detecting the occurrence of a sudden event or for responding to a sudden event.

Considering communications further, the apparatus has a hierarchal communications architecture comprising two levels. A first level is constituted by a fast-communications layer from wide-area PMUs 16 to controllers 24 which is designed for flexibility by way of a plug-and-play configuration for connection of new resources. The fast-communications layer has an update time of 20 ms for a 50 Hz system. A second level is constituted by a slower communications layer which is operative to send data back and forth between the controllers 24 and the central controller 34 with a much slower update rate compared with the fast-communications layer. The hierarchal communications architecture provides for priority being given to measurements required for sudden event detection and response. The central controller 34 is dedicated to handling slower-update data to and from the controllers 24. It is to be noted that providing measurements from regional aggregators 12 direct to the controllers 24 reduces communication delays. Furthermore embodying decision making concerning response to a sudden event within each controller 24 and such that decision making is independent of other controllers reduces response time.

Each controller 24 receives no direct information in respect of operation of the other controllers 24. Even so, each controller 24 is aware of its own state within the wider apparatus and makes use of data from the regional aggregators 12. By comparison of its own data with wide-area data, controllers in an area each determine: a proportional response for the local controllable apparatus; and when the response is required. The proportion of response required from an area depends on data received from the central controller 34. This data is based on the amount of response each controller 24 has available at its disposal and calculation of the proportion of the total area response the controller is capable of delivering. The central controller 34 collates resource availability from all controllers 24 and generates a total value for the amount of resources available in the area. Each controller then compares the required response from the area with the available response in the area to determine its contribution to the response. Local frequency control is an optional capability. Where reception of wide area data is lost or such reception is impracticable such as for reason of cost, a controller 24 is operative in dependence on the local measurements made by respective local PMUs 26. Where local control is intended to operate independent of wide area measurements only local frequency measurements are used. In such circumstances a Commercial Off-the-Shelf (COTS) frequency measurement relay may be used instead of a full PMU. It is to be noted that local control should be slower than wide-area control to ensure that the local control does not detract from the wide area response but will instead provide response when it is required subsequent to whatever wide-area action has been taken as is described in more detail below.

Figure 2:
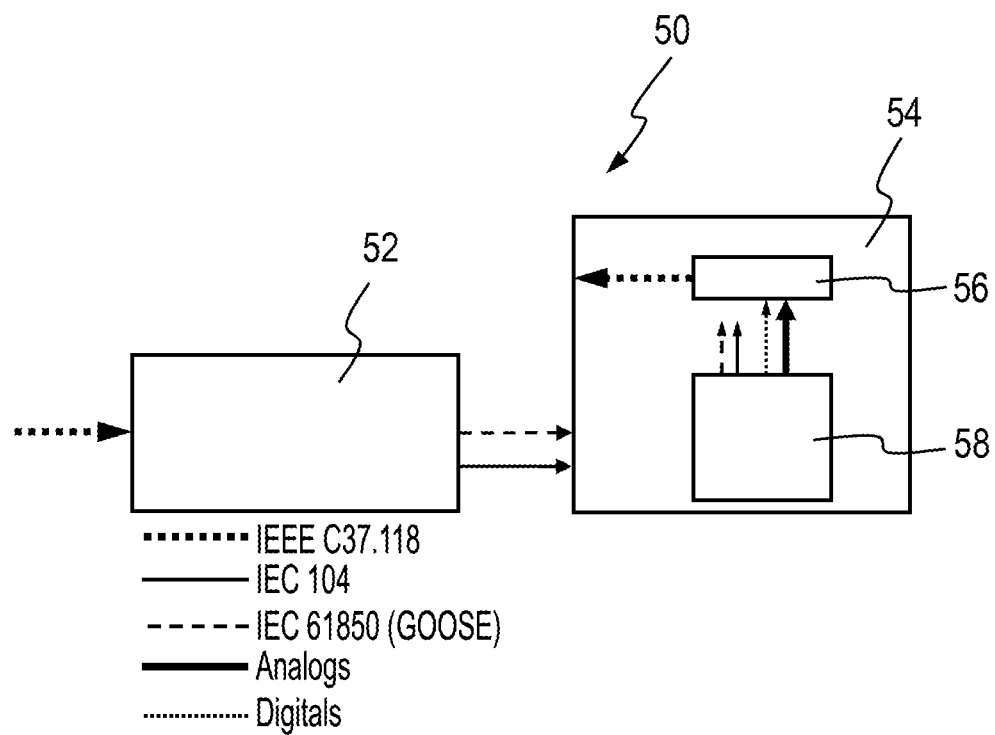
FIG. 2 is a block diagram representation of distributed control apparatus.

A block diagram representation of distributed control apparatus is shown in FIG. 2. The distributed control apparatus 50 of FIG. 2 comprises a controller 52 and a control interface 54. The control interface 54 is shown as comprising a local PMU 56 and local resources 58. The controller 52 receives input signals depending on its configuration. There are two possible configurations for the controller 52, namely local control mode and wide-area Control mode. Both configurations are provided for in the distributed control apparatus 50 as shown in FIG. 2. The controller 52 receives an IEEE C37.118 data stream containing at least voltage phasor and frequency information of a wide-area nature or at least local frequency measurements when in local mode. The controller 52 also receives data from the resource 58 either directly through a control protocol or indirectly via the local PMU 56. Where data from the resource 58 is in accordance with a protocol which the controller 52 can receive (e.g. IEC 60870-5-104 or IEC 61850 (GOOSE)) data communication is implemented by way of a direct, appropriate link between them. Where data from the resource 58 is in accordance with an exceptional protocol, an interface is employed between the controller 52 and resource 58, e.g. MODBUS to IEC61850 (GOOSE). Where data from the resource 58 is in the form of analogue or digital data, such data is sent directly to the local PMU 56 and communicated back to the controller 52 through a local IEEE C37.118 stream.

Figure 3:
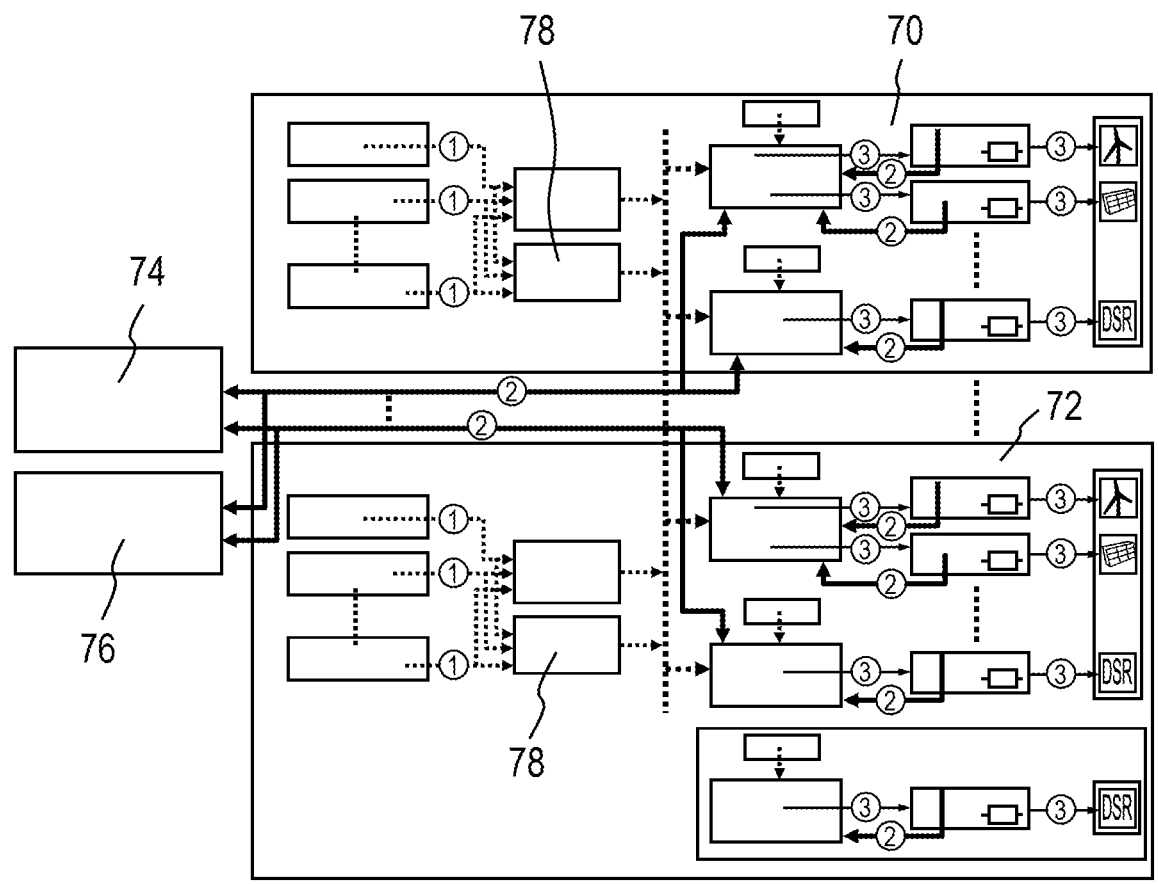
FIG. 3 is a block diagram representation of apparatus comprising redundancy.

A block diagram representation of an apparatus involving redundancy is shown in FIG. 3. The apparatus of FIG. 3 comprises a first set of apparatus 70 of the kind shown in detail in FIG. 1 in respect of a first area of the electrical power network and a second set of apparatus 72 of the kind shown in detail in FIG. 1 in respect of a second area of the electrical power network. The reader is directed to FIG. 1 and the accompanying description above for a description of the components comprised in each set of apparatus. As indicated by the broken line extending between the first and second sets of apparatus 70, 72 in line with their respective control interfaces the apparatus of FIG. 3 comprises plural further sets of apparatus although such plural further sets of apparatus are not shown for sake of clarity in FIG. 3. The apparatus of FIG. 3 further comprises a primary central controller 74 and a redundant central controller 76. Each set of apparatus 70, 72 further comprises a redundant regional aggregator 78 in addition to the already described primary regional aggregator. Loss of a primary regional aggregator is addressed by the presence of the redundant regional aggregator 78. Also loss of the primary central controller 74 is addressed by the presence of the redundant central controller 76. Such a configuration addresses the perceived main points of failure.

Figure 4:
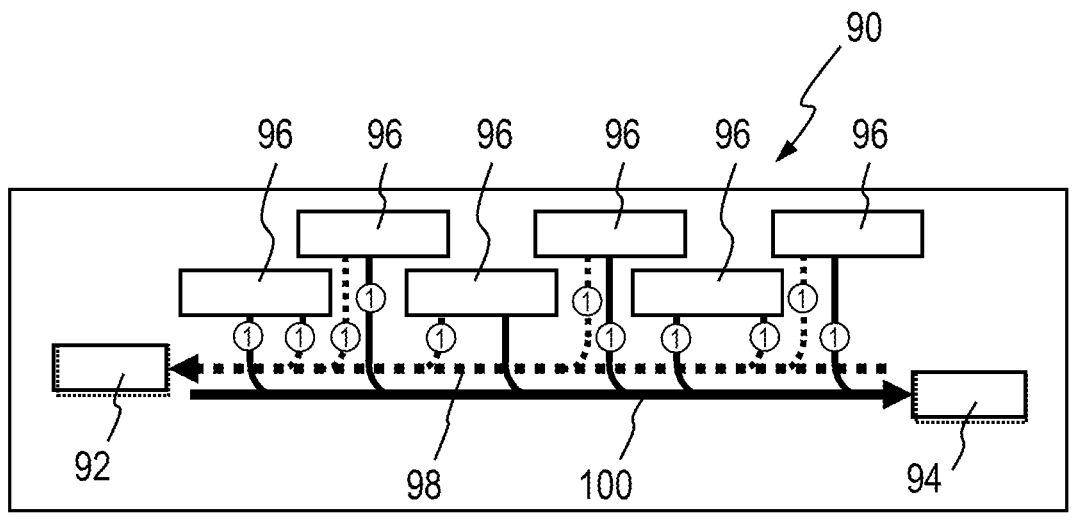
FIG. 4 shows aggregation of area measurements in more detail.

Aggregation of area measurements is shown in more detail in FIG. 4. The arrangement 90 of FIG. 4 comprises primary and secondary regional aggregators 92, 94 and plural PMUs 96 with communication therebetween being by way of two virtual local area network (vLAN) streams 98, 100 with each vLAN stream being operative in accordance with the IEEE C37.118 PMU Protocol. Each of the PMUs 96 is configured to use a multicast communications protocol to two the two regional aggregators 92, 94 whereby each regional aggregator receives the same data and therefore produce the same output data. Each aggregator 92, 94 communicate its output to the vLAN streams so that each controller (not shown) sees both aggregators in an area. A controller decides to switch to the secondary regional aggregator if connection is lost to the primary regional aggregator but the connection to the secondary aggregator remains good.

Figure 5:
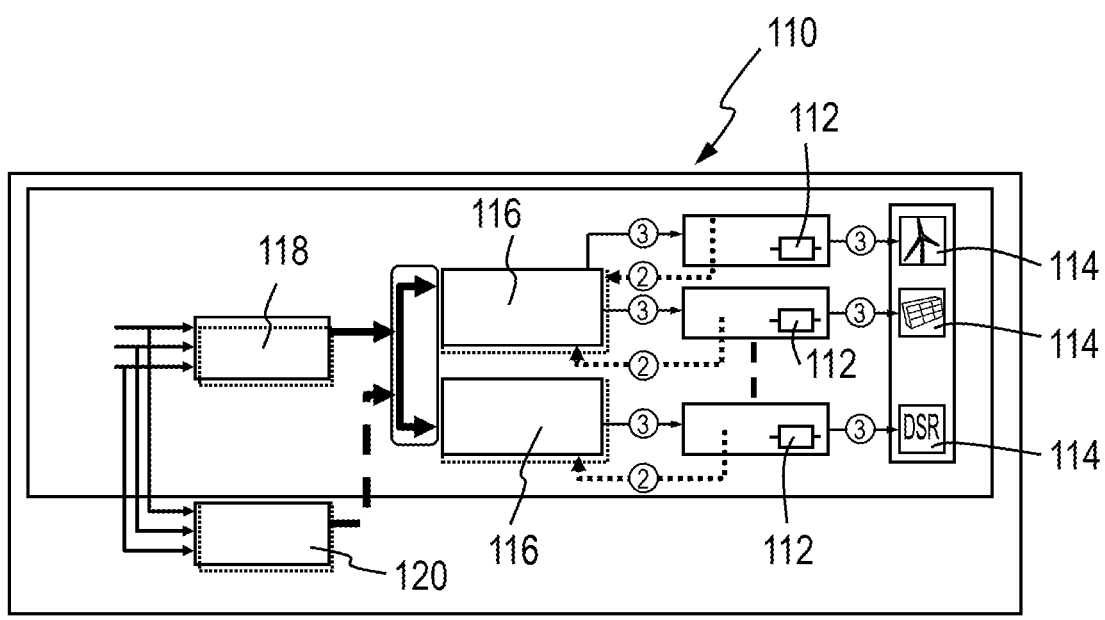
FIG. 5 is a block diagram representation of apparatus local to a controller configured for redundancy.

A block diagram representation of apparatus 110 local to a controller configured for redundancy is shown in FIG. 5. The apparatus 110 of FIG. 5 comprises plural control interfaces 112 each operative with a respective controllable resource 114 as described above with reference to FIG. 1. Furthermore the apparatus 110 of FIG. 5 comprises plural controllers 116 which are operative with the control interfaces 112 as described above with reference to FIG. 1. In addition the apparatus 110 of FIG. 5 comprises a primary regional aggregator 118 and a secondary regional aggregator 120 which are both in data communication with the controllers 116 to thereby provide for redundancy as described above.

As described above, each controller is configured to be operative in a local control mode and a wide area control mode. Considering this aspect of operation in more detail, the controller has no observability of wide-area measurements when in local control mode and thus relies solely on the local PMU measurement of frequency. Local frequency measurements do not benefit from the filtering or averaging effect of the regional aggregators and may therefore contain oscillations. To prevent the controller responding to such oscillation, which may cause spurious tripping, the frequency signal is filtered using a low-pass filter to remove effects from inter-area oscillations. Detection of occurrence of a sudden event and response thereto is thus based on the local filtered frequency measurement data. Turning now to the wide area mode, the controller receives wide-area measurements in addition to local measurements. Each controller has sight of each of the regional aggregators. Data streams from the regional aggregators are manipulated to by way of a Phasor Data Concentrator (PDC) comprised in the controller to create system equivalent values. Furthermore each regional aggregator communicates its output stream using a dedicated ID/IP address. The PDC comprised in the controller is configured to receive each of the plural data streams as well as the data stream from the local PMU. The PDC is operative to time-align the PMU data streams. It should be noted that that in view of the normal need for speed of response, wait times associated with received packets may be significantly less than wait times in monitoring systems. The PDC is further operative to combine data streams from the regional aggregators to form system equivalent data and more specifically a system, an area and a local set of angle and frequency data.

Detection of occurrence of a sudden event and control in dependence on detection of such occurrence will now be described. Objects are: halting a fast frequency excursion as quickly as possible; and responding at appropriate locations and in proportion so as to minimise risk of instability through restoration of power flow pattern to the pre-event state.

The subject electrical power network is divided into plural areas so as to have a location specific element to the response whereby the purpose is to minimise effects on stability and prevent system separation. These areas are formed based on coherency where everything within a region should be tightly coupled (i.e. very difficult to pull apart). Coupling between regions is liable to be weaker to thereby present an increased risk of separation. The risk of separation between areas is of greater concern than separation within an area on account of the weaker inter-area coupling and thus forms the object of the present location specific response. Where the risk of separation is lower within a region, normally there is less concern as regards location. Furthermore resources within areas do not normally require the location specific element to a response because usually angle differences are relatively small between locations within a region therefore less prone to instability.

The coupling between components in an area can change under different scenarios; such changes are taken into account. It is to be noted that lower risk is presented where there are more coherent regions. Various types of coupling are taken into account by performing studies for a number of different system scenarios. For example if areas that were tightly coupled form two weakly coupled areas in a certain system scenario, they should always be treated as two areas. By finding the worst case number of coherent areas, the risk of forming an area which is weakly coupled is significantly reduced.

The PMU signals within an area have weights assigned to them which are based on the inertia. By way of example consider two PMU signals, where one PMU is connected to a large generator and the second PMU is connected to a smaller generator. In an event, the small generator will move faster and further relative to the larger generator, however the overall behaviour will be dictated by the inertia, which in the present case is from the larger generator. Simple averaging weights both PMUs evenly giving a false representation of overall behaviour. If weights are assigned to each of the signals, weighted averaging is used whereby the signal corresponding to the larger generator has a larger effect on the averaging output to thereby better represent overall behaviour. Weights are assigned to each of the PMU signals coming into a regional aggregator. This is achieved by configuring the regional aggregator itself for each of the incoming signals from the PMUs. The inertia values are calculated offline using models.

Figure 6:
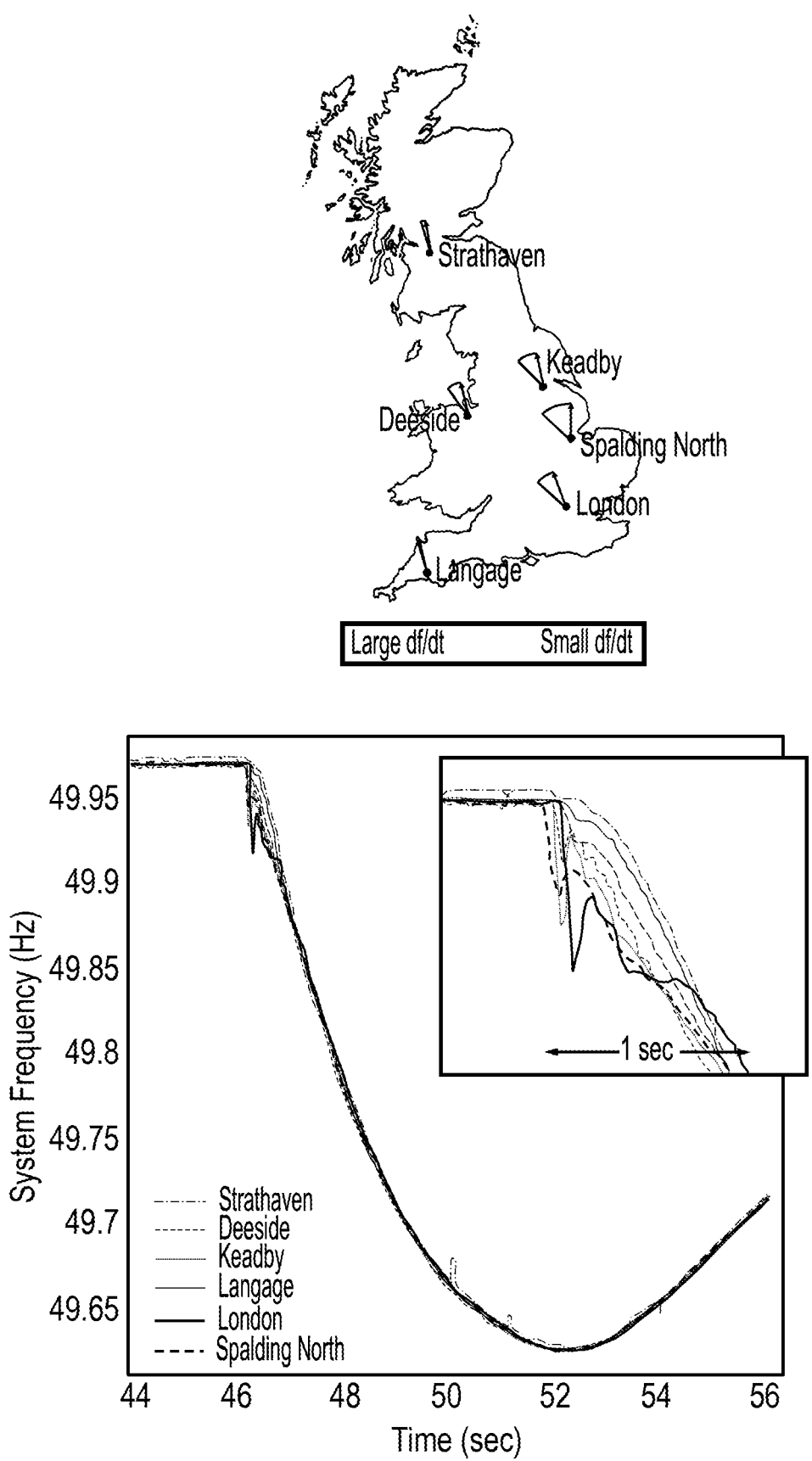
FIG. 6 shows behaviour after loss of a generator.
Figures 7A, 7B:
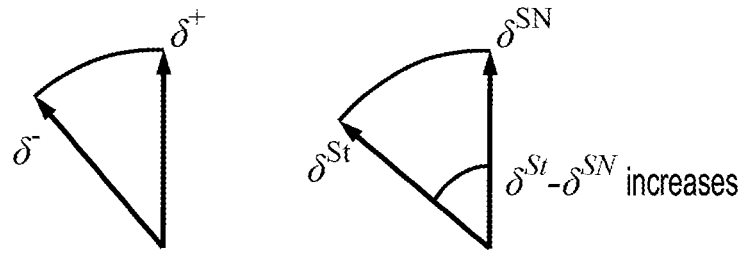
FIGS. 7A and 7B respectively show angle behaviour after an event and angle difference across the network.
Figure 8:
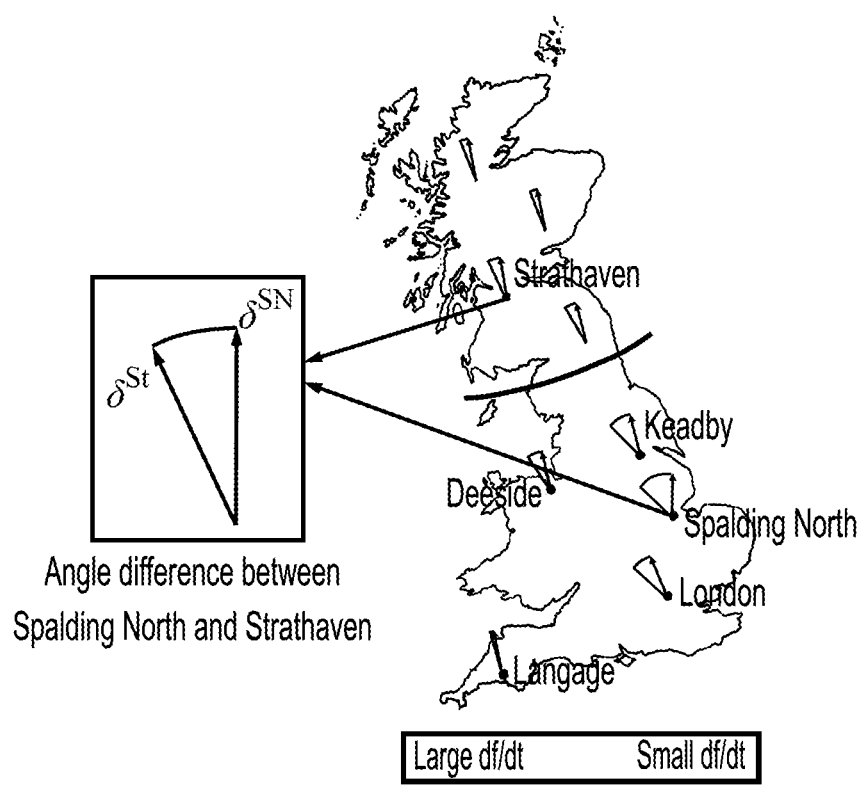
FIG. 8 shows angle difference between two points.

FIG. 6 shows behaviour of an electrical power network in response to a loss of generation. On account of imbalance in energy in the network, the remaining generators slow down and the frequency drops. The overall rate at which the frequency drops is dependent on the inertia of the network. The same principle applies at an area level. Considering the initial moments after the loss of generation and as can be seen from the graph there is a spread among the frequency trends between the different locations on account of area inertia but also proximity to the event. Proximity to the event is reflected through change in angle, where angles closer to an event change more than those further away. In the event of a generator loss near Spalding North, the figure shows possible angle behaviour where angles move back relative to their pre-fault states, as shown in FIG. 7A, due to the increased loading of the remaining generators. Comparing these changes around the network provides an angle difference across a network which is closely linked to the power flow and stress between two measurement points. Taking measurement points at Spalding North and Strathaven, the angle difference between these locations after the event increases as is shown in FIG. 7B. This behaviour can be seen from FIG. 8 which relates to measurements at two locations across a boundary. An increase in angle difference between these two locations implies increased stress on the boundary. Where the event itself increases the stress across the boundary, it is important for the purposes of stability that the actions of a controller do not increase the stress.

Figures 9A, 9B, 9C:
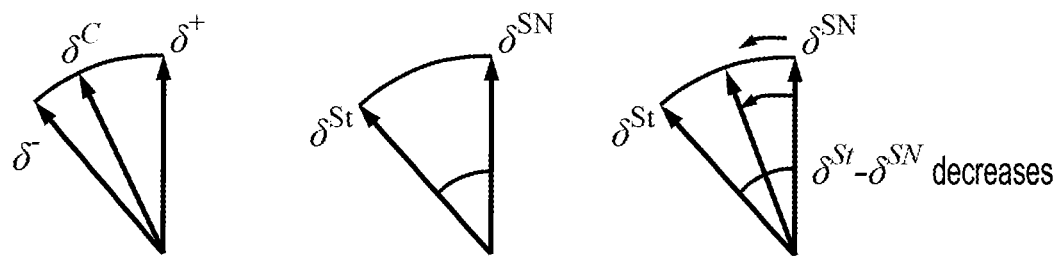
FIGS. 9A and 9B respectively show the effect of control and angle difference across the network and FIGS. 9C and 9D respectively show positive control and negative control action.
Figure 9D:
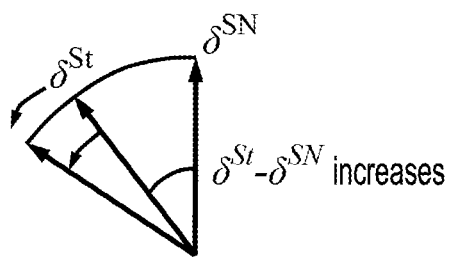
Figure 10:
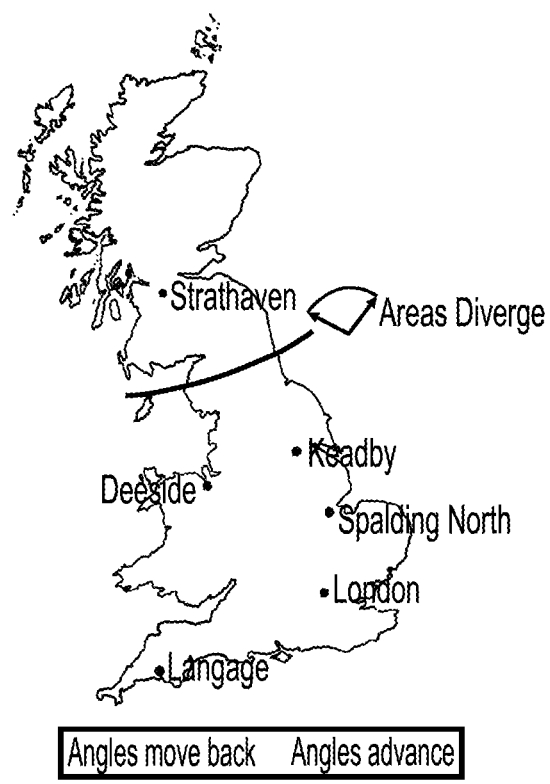
FIG. 10 shows the effect of increasing angle difference.

After a loss of load or generation event, an energy imbalance exists in the network. The object is to control resources distributed across the network to contribute towards addressing the imbalance. As new resources begin to address the imbalance, the angles at these locations will begin to change, moving forward with respect to the pre-control state in the case of increased output as is shown in FIG. 9A. This is due to the decrease in electrical loading on the existing equipment allowing the angles to recover and move towards the pre-fault angle. However, considering the locations at which these control actions take place is vital for network stability. Consider the angle difference between two locations which has increased due to the event shown in FIG. 9B. For control action that takes place near Spalding North (near the event), the angle at Spalding North moves forward with respect to the post-fault state and the angle difference across the system decreases as shown in FIG. 9C. However, if the control action takes place near Strathaven, the angle moves forward with respect to the Strathaven post-fault state and increases the overall angle difference across the system as shown in FIG. 9D. Should the angle difference become too large, the system may exceed the limit of stability where the risk of the system splitting increases greatly. It is therefore important for control that any actions do not serve to further jeopardise the network but instead provide actions in a manner to alleviate stress of the network. While both control actions will minimise the energy imbalance, the location of where actions are taken should also be considered. The effects of increased angle difference are shown in FIG. 10.

Detection of occurrence of a sudden event will now be described in more detail. As described above each controller is operative to detect a sudden event in dependence on receipt of wide-area measurements. This aspect of operation is particularly important where the effects of reduced inertia result in more frequency movement at a local level without there being a significant event to the wider network. For example, an area with power generated predominantly from wind may experience larger variation in frequency. However there may be insignificant variation to warrant a network wide response. The local control and/or protection such as loss-of-mains which relies on Rate of Change of Frequency (RoCoF) may not operate as expected. Visualisation of the wider system may be of benefit in determining if response is required or not for such fluctuations. Also, as the frequency of the network becomes more mobile, having detection based on local signals only may result in frequency response being triggered quite regularly from controllable resources and thereby reduce the lifespan of the controllable resources. It is therefore more effective to have such controllable resources reacting only when an event is deemed a wide area event.

Each controller is operative to detect a wide-area event independently using data from the regional aggregators. An event detection algorithm operative on a controller is capable of being triggered from local PMU measurements and from wide-area PMU measurements depending on the availability of wide-area signals as described above. The wide-area detection mode is prioritised because of its ability to identify the event at an earlier stage in contrast to the local mode which involves delay on account of the filtering of the local signals. However if the wide-area signals are not available to the controller, then the controller is operative to make use of local PMU measurements for detection and initiation of control. The frequency data acquired by the local PMU is passed through a low pass filter in order to remove inter-area and local oscillations and fault-related dynamics. When both wide-area and local event detection are active and when wide-area event detection is triggered, local event detection is inoperative to change the mode of operation of the controller. However, local event detection is used as backup in the event that wide are signals are unavailable or when wide area event detection fails to operate.

The event detection algorithm is configured for fast detection events with rate of change of frequency greater than a defined limit, for example 0.2 Hz per second for the UK system based on expected future behaviour. For wide-area event detection the event detection algorithm uses a moving window which stores the previous values of system frequency and respective time stamps. FIG. 11A shows a moving window used in event detection. For every new system frequency measurement, $f_{new}$, with time stamp, $t_{new}$, the event detection algorithm checks which time stamp $t_{new \pm xmHz}$ crossed $f_{new \pm xmHz}$, where x is a user configurable value, e.g. when x=50 mHz, the time taken for the frequency to move ±50 mHz and where a time taken is less than 0.26 s signals a detection based on the 0.2 Hz per second limit. The time difference of 0.26 s is dependent upon defined rate of change of frequency (i.e. 0.2 Hz per second) that the event detection algorithm is configured to detect as a frequency event $$\left(\Delta t = \frac{\Delta f}{RoCoF} = \frac{0.050 \text{ Hz}}{0.2 \text{ Hz/s}} = 0.25 \text{ s},\right.$$

yielding 0.26 s based on an execution time step of 20 ms). The advantage of the present approach is there is no need to wait for a predefined time which can add a delay; instead frequency is used and the time difference calculated. To add robustness to the detection process, a best fit approach is used to validate the detection using more samples as shown in FIG. 11B. This provides faster detection for fast events. Slower events may, however, not be caught such as if the frequency change is less than 0.2 Hz per second. If the frequency change is slow, it may yet still cross into an alarm level such as 49.5 Hz. Therefore, the event detection algorithm is configured to apply an additional set of bounds with such bounds being slightly less than the danger thresholds. If a slow frequency event occurs, it will be detected when it crosses a boundary value, such as 49.6 Hz/51 Hz.

The same approach is used for deriving a rate of change of frequency value. As the rate of change of frequency value should be related only to the period of the event, using a predefined window would require waiting for the window to be filled with only event data, hence delaying determination of a rate of change of frequency. Using a rate of change of frequency value with data in the window from before the event will not show the true rate of change of frequency of the event. The window described above is used to give the initial window for the rate of change of frequency calculation. A growing window method is then applied with the window growing for each new sample captured to thereby further refine the rate of change of frequency value during the course of the event as shown in FIG. 11C. When the window has grown to its defined limit, it becomes a moving window of fixed size as shown in FIG. 11D.

When a fault occurs in the system it is characterised by a large voltage drop with increasing frequency. This is not a true over-frequency event, but seen during fault behaviour. The controller is configured not to react to such behaviour. While the fault remains in the system, the controller is configured to block event detection. After the fault is cleared the event detection algorithm is configured to wait for a set time, which is in the order of 20 to 40 ms, before clearing the event block detection. Fault measurements values are thus allowed to pass through the PMU fully and accelerating units are allowed to slow down.

The present approach uses the hierarchical data topology described above, i.e. the fast PMU-based network level and the slower centrally supervised network level. The two levels are used together to implement proportional targeted response to a sudden event. The object for the wide area response is to take the total system requirement for response and deploy it across the system depending on location and in proportion to the sudden event. Therefore, the amount of response from each of the controllers is dependent on the following.

The total required response from the system, $P_S$, is the general characteristic for finding the change in power following a sudden event using the rate of change in frequency and the inertia of the system. The inertia value, H, will be set using the central controller and communicated down to each controller. Each controller is therefore able to calculate the $P_S$ value.

$$P_S = \frac{H}{2}\frac{df}{dt}$$

where
H is system inertia (estimate) and $$\frac{df}{dt}$$

is rate of change of system frequency.

The total response required from the system is distributed between the areas depending upon the angle indicators. This is done to restore the angles and power flows as closely as possible to the pre-event pattern to minimise risk of instability. This is achieved using a function of the difference between the area and system angles to create an area weight:

$$w_{R_k} = f(\Delta\delta_{R_k} - \Delta\delta_S)$$

where
$\Delta\delta_{R_k}$ is change in area angle k from pre-fault state and
$\Delta\delta_S$ is change in system angle from pre-fault state.

The approach involves having information about the available response in the areas. Each controller therefore communicates information about its local resource to the central controller where the sum of the individual capacities is determined to form the area capacity:

$$R_k = \sum_{i=1}^{n} L_i$$

for n controllers
where
$L_i$ is maximum available power of local resource and
$R_k$ is maximum available power from area k.

In one implementation where resources all share similar characteristics, the output from each controller is thus a function of the angle difference, required response and the local proportion based on $$\frac{L_i}{R_k}:$$

$$\Delta P_{1_i} = \frac{L_i}{R_k} \cdot \frac{w_{R_k}}{\sum_{j=1}^{m} w_{R_j}} \cdot P_S$$

for m areas

To implement the above formula the controller relies on the central controller for values such as $R_k$ and H. These values do not need to be updated at a fast rate and hence can be updated at a much slower rate. Such reduced dependence on data from the central controller provides for less data on the network and therefore less delay. Values such as $w_R$ and $P_S$ are calculated locally in each controller using the aggregated signals and used for fast detection.

One implementation of an algorithm for a central resource allocator is described below. Available resources are further classified in dependence on resource response time, i.e. one of fast, slower and discrete response which will be a characteristic of the resource type. Given the typical diversity of resources, resources are categorised according to type with the type data being used by the central controller for initiating control in stages: Immediate triggering—e.g.

breaker opening. Continuous response—e.g. variable speed drives. Delayed response—e.g. load ramping.

An alternative implementation of an algorithm for a central resource allocator can be used with a greater number and greater diversity of resources. According to this implementation, resources are allocated to different groups of resources with each group of resources providing a particular response profile based on the response profiles of the resources within the group. A response profile of a resource may comprise one or more of speed of response, duration and delay. By way of example a resource group may comprise plural resources which each provide a different speed of response, duration of response and delay before responding.

The controller communicates the response characteristics of its connected device directly whereby the central controller is then operative to perform classification based on these characteristics. The following resource data is therefore normally required at a minimum: Available capacity. Response time. Duration of response/energy. Availability (enabled/disabled).

In certain forms of the invention wide-area control actions are deployed in two phases depending upon the level of response required. The object in such forms is to provide a fast initial response which is particularly important for severe events which is then followed with additional action if necessary. In one form, resources are assigned to the two distinct phases depending on their speed of response. Fast resources such as load shedding are immediate but some of the continuous resources may also have a fast response time e.g. battery storage. Resources with immediate triggering will be prioritised due to their fast response. In the central controller, by defining a threshold time for fast response, resources which respond in less than this time are assigned to the first phase while resources having a response time that exceed the threshold are assigned to the second phase. If the central controller determines that there is too much response in either phase, the central controller is configured for adjustment of the threshold.

In an alternative form, resources are allocated to more than two resource groups according to the characteristics of the resources. Response is then deployed by requesting power according to the priority of these resource groups, beginning with the resource groups providing the fastest responses. Where additional response is required, resources from the slower resource groups are called upon. This approach is still applied using two phases as described above but provides for greater flexibility of application of resources within the two phases. Concerning slow-update data, each controller communicates back to the central controller on the specifics of its connected resources such as: Category of resource. Available response. Response time. Duration of response. Availability of resource.

The central controller communicates at a minimum to all connected controllers the following: The phase or band to which a resource is assigned. The total response in an area. The estimated Inertia of the system. If resource is required by the scheme.

Turning now to consider local control, after wide area control has had time to act the controller changes to a local control mode in which local measurements are used to restore frequency. Such local measurement signals are slower than the wide area signals due to filtering of the local measurement signals. The controller is configured such that local control is not operative until faster wide area control has had time to act in order to thereby minimise control action increasing stress on the system. This form of local control is coordinated with the wide-area control whereby there is a smooth transition from the wide-area control to the local control state.

A controller can also be configured to operate in an independent local mode. When so configured a controller does not rely on communication with the central controller and initiates control based upon the locally measured signals only. In one implementation of this approach, the output of a controller when so configured is defined by:

$$\Delta P_2 = \frac{df}{ft} \frac{1}{K_L} L_i$$

Where $K_L$ is the constant derived for the worst case $$\frac{df}{dt}$$

to which the system must respond, $$K_L = \max\left(\frac{df}{dt}\right),$$

for the largest possible event in the system. The output of the controller is thus defined by the severity of the event compared to a pre-determined severe event.

In an alternative implementation of the independent local mode, a series of frequency and rate of change of frequency thresholds are specified which provide for deployment of a level of response selected from plural different levels of response in dependence on which threshold is being violated. For continuous resources, the control output is a proportion of its maximum availability. For discrete resources, the control output is according to a user defined band which is linked to one of the thresholds.

Turning now to consider event response control, there are circumstances where a response driven approach is appropriate, such as in Iceland where power measured directly from the largest smelters is used to accelerate specific controls. Such circumstances are accommodated by introducing a $\Delta P_3$ term to the algorithm which is calculated for a specific event, e.g. by direct measurement of loss of power. $\Delta P_3$ refers to power change instructed if certain generation or load tripping events take place. If, for example, a 300 MW smelter trips the response $\Delta P$ requested at a specific controller due to the event may be, say, 40% of 300 MW, and this may be initiated immediately on detection of the event rather than introducing delay inherent in the angle and frequency measurements. In effect, this provides an initial inter-tripping action supplemented by wide-area action that tunes the response to the sudden event and covers a more general set of disturbances.

Turning now to coordination of the different response types, each controller is configured to coordinate between the wide-area response, $\Delta P_1$, and the local response $\Delta P_2$. However, some controllers are also configured for event based control and therefore provide for additional coordination between wide-area, local and event-based. Such an approach uses a priority method which can be based on time. Event based control is the most accurate if it directly measures a change in power and therefore should take priority. As a change in power can be detected almost immediately, response would be delayed if detection were to be by way of wide-area signals. For wide-area control, a key object is to avoid introducing instability where the first 0.5 s to 1 s is critical. Therefore, the wide-area response mode should act first or at least have an opportunity to act before handing over to the local response mode. The power deployed by the controller, $\Delta P_c$ is coordinated between control stages and is, by way of example, as follows (using 1 s as an example for $\Delta P_1$). The $\Delta P_c$ value can be positive or negative depending on the type of event: under or over frequency.

$$\Delta P_c = \begin{cases} \Delta P_3, & \text{if } t = 0 \\ \max(|\Delta P_1|, |\Delta P_3|), & \text{if } t < 1 \text{ s} \\ \max(|\Delta P_1|, |\Delta P_2|, |\Delta P_3|), & \text{if } t > 1 \text{ s} \end{cases}$$

In the above equation, $\Delta P_3$ acts immediately as it is a directly measured value. If an event is detected using wide-area signals, it will inherently take longer than the event based approach and therefore the control output should change if $\Delta P_1 > \Delta P_3$, but hold $\Delta P_3$ otherwise. After wide-area control has had a chance to act, for 1 s for example, the controller is operative to hand over to local measurements where the output is changed if $\Delta P_2 > \Delta P_1$ or $\Delta P_3$. An alternative implementation of coordination involves including a local-coordinated mode which acts immediately after the wide-area mode in accordance with $$\Delta P_c = \begin{cases} \Delta P_3, & \text{if } t = 0 \\ \max(|\Delta P_1|, |\Delta P_3|), \text{ wide area mode} & \text{if } t < 1 \text{ s} \\ \Delta P_1, \text{ local coordinated mode} & \text{if } t > 1 \text{ s} \\ \max(|\Delta P_2|, |\Delta P_3|) & \text{if wide\_area signals absent} \end{cases}$$

In the above equation, event based detection $\Delta P_3$ remains the fastest form of control, followed by the wide-area response which only acts when a system-wide event is detected. During the first 1 s period, the controller acts in wide-area mode. After the 1 s period the control output transitions to the local-coordinated mode which uses the local measurements to continue control. This latter stage allows both for additional regions to contribute to the response and provide additional response where required. In this implementation, $\Delta P_2$ is only operational if the wide-area signals are absent.

A final element to coordination involves the controller not changing direction of its output signal while responding to an event, e.g. if the control scheme is deploying additional power, controllers can only increase their output, and cannot decrease the output until the event has cleared. This is referred to as a 'ratcheting' mechanism. The intention of this mechanism is to prevent further exacerbation of system oscillations and damping by allowing resources to follow the oscillatory signals.

In another embodiment the method accommodates islanding irrespective of whether the sudden event happens during an islanding state or the sudden event results in islanding. This embodiment comprises detecting present islanding. Detecting present islanding is based on the principle that frequency measurement values from connected regions of the electrical power network cross each other more often over a given time period when the electrical power network is connected, than when the frequency measurement values are from disconnected (islanded) parts of the electrical power network. This embodiment further comprises detecting impending islanding. Detecting impending islanding comprises determining the current measured angle difference between regions projected forward in time using the frequency difference and comparing the projected angle difference with a pre-defined threshold value of angle difference. If the projected absolute angle difference is greater than the predetermined threshold value the regions are heading towards disconnection.

The islanding detection method is applied at the local controller using the shared data from regional aggregators. As described above the island detection method identifies if the system is islanded, and if so, which of the regions are synchronously connected with the local controller. The local controller then uses the same principles as if the system is connected as described above. The following features are, however, required to accommodate islanding:

System aggregation programmed to exclude all regional aggregation signals that are not synchronous with the local controller's own measurement and/or the region in which it operates. Thus, the system rate of change of frequency value is calculated only for the remaining connected area. Revision of the parameters relating the required power response and the system rate of change of frequency value. This is achieved by reducing the factor used in the intact system by the proportion of inertia of the remaining connected regions relative to the total system. Excluding the response of resources in disconnected areas from the local controller's prediction of response This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of controlling an electrical power network in dependence on a sudden event which is liable to lead to further loss or excess of generation or load, the electrical power network comprising plural controllers with each controller being configured to provide for control of controllable apparatus connected to the electrical power network at a different respective location in the electrical power network, the method comprising:
   determining the occurrence of a sudden event that is liable to lead to further loss or excess of generation or load in the electrical power network or part of the electrical power network;
   receiving plural substantially synchronised quantities in each of the plural controllers, each of the plural quantities corresponding to at least one of frequency and angle at a respective one of plural different locations in the electrical power network; and
   generating a first control output from each of the controllers in dependence on the received plural quantities, each first control output being for control of its respective controllable apparatus, each controller being operative to generate the first control output independent of operation of any other controller and on an ongoing basis in dependence on ongoing receipt of the plural quantities;

wherein the step of determining the occurrence of a sudden event comprises analysing at least one quantity corresponding to frequency at each of plural different locations in the electrical power network and wherein the plural quantities comprise a quantity corresponding to at least one of voltage phasers and current phasers received from the different locations in the electrical power network.

2. The method according to claim 1 wherein each controller is operative to generate the first control output without being dependent on a signal received from any of the other plural controllers.

3. The method according to claim 1 further comprising before the step of determining the occurrence of a sudden event a central controller providing for coordination of and exerting supervisory control over the plural controllers by way of data received in each of the plural controllers from the central controller.

4. The method according to claim 3 wherein the steps of determining the occurrence of a sudden event and generating the first control output in dependence on the received plural quantities is carried out by one of the plural controllers without communication with any other controller of the plural controllers or the central controller.

5. The method according to claim 3 wherein the one controller of the plural controllers is operative to determine that a sudden event is liable to lead to further loss or excess of generation or load if a quantity has a rate of change greater than a predetermined value.

6. The method according to claim 5 wherein the one controller of the plural controllers is operative to apply a moving window approach wherein the window is of changing width whereby previous quantity values are taken into account.

7. The method according to claim 1 wherein at least one of: the step of determination of the occurrence of a sudden event; and the step of generating the first control output from one controller of the plural controllers may be carried out in dependence on at least one further quantity, the at least one further quantity being measured locally to the one controller of the plural controllers.

8. The method according to claim 7 further comprising: analysing the plural quantities received in the one controller of the plural controllers; and determining on the basis of measured signal availability in respect of at least one of the received plural quantities that operation of the one controller of the plural controllers in respect of at least one of determination of occurrence of a sudden event and generation of a control signal is to be in dependence on at least one quantity measured locally to the one controller of the plural controllers.

9. The method according to claim 1 wherein one controller of the plural controllers is operative to monitor for a fault in apparatus comprised in the electrical power network, the one controller of the plural controllers being configured not to determine that there is a sudden event in dependence on detection of a fault.

10. The method according to claim 9, wherein following detection of a fault the one controller of the plural controllers operative to resume monitoring for a sudden event after a predetermined period of time.

11. The method according to claim 9 wherein the one controller of the plural controllers is configured to generate the first control output in dependence on at least one of system frequency and rate of change of system frequency.

12. The method according to claim 11 wherein the first control output is generated in further dependence on system inertia.

13. The method according to claim 1 wherein one controller of the plural controllers is operative to generate the first control output in dependence on at least one local quantity in addition to the received plural quantities, the local quantity corresponding to frequency at the same location as the one controller of the plural controllers.

14. The method according to claim 1 wherein one controller of the plural controllers is configured to generate the first control output in dependence on the proportion of maximum available power of resource local to the controller and maximum available power from the area comprising the one controller of the plural controllers.

15. The method according to claim 14 wherein the electrical power network comprises a central controller which is configured to receive data from the plural controllers in respect of maximum available power from the area comprising the central controller and to convey data in dependence thereon to the one controller of the plural controllers.

16. The method according to claim 1 wherein one controller of the plural controllers is configured to take response capacity of each of plural areas comprised in the electrical power network into account in generating the first control output.

17. The method according to claim 1 wherein one controller of the plural controllers is configured to take operational characteristics of the electrical power network into account.

18. The method according to claim 1 wherein the step of determining the occurrence of an event may comprise-determining in dependence on the received plural quantities at least one of: a change in a-quantity; a spread of quantities; and a change in loadflow behaviour.

19. The method according to claim 1 wherein the control output may provide for at least one of: immediate triggering of a controllable resource; continuous response of a controllable resource; and delayed response of a controllable resource.

20. The method according to claim 1 wherein one controller of the plural controllers is operative to generate a second control output in dependence on at least one local signal to the exclusion of the plural quantities.

21. The method according to claim 20 wherein the one controller of the plural controllers is configured such that control in dependence on at least one local signal and without the plural quantities takes place subsequent to control in dependence on the plural quantities.

22. The method according to claim 20 wherein the second control output depends on a rate of change of local frequency.

23. The method according to claim 20 wherein the second control output depends on the maximum available power of the controllable apparatus.

24. The method according to claim 20 wherein the second control output has one of plural levels selected in dependence on comparison of rate of change of local frequency with each of plural different threshold values.

25. The method according to claim 1 further comprising:
at least one of detection of a present islanded state and detection of an impending islanded state; and identifying parts of the electrical power network that are connected.

26. The method according to claim 25 further comprising excluding signals which are not synchronous with at least one of: a measurement of a selected controller of the plural controllers; and a part of the electrical power network to which the selected controller belongs.

27. The method according to claim 25 wherein the first control output is generated having regard to controllable apparatus comprised in the connected parts of the electrical power network following detection of one of a present islanded state and detection of an impending islanded state.

28. Apparatus for controlling an electrical power network in dependence on a sudden event which is liable to lead to further loss or excess of generation or load, the apparatus comprising:

an arrangement which is configured to deter mine the occurrence of a sudden event that is liable to lead to further loss or excess of generation or load in the electrical power network or a part of the electrical power network;

plural controllers with each controller being configured to provide for control of controllable apparatus connected to the electrical power network at a different respective location in the electrical power network in dependence on plural substantially synchronised quantities being received in each of the plural controllers with each of the plural quantities corresponding to at least one of frequency and angle at a respective one of plural different locations in the electrical power network, control of the controllable apparatus being by way of a control output generated by each controller in dependence on the received plural quantities, each control output being for control of its respective controllable apparatus and each controller being operative to generate the control output independent of operation of any other controller and on an ongoing basis in dependence on ongoing receipt of the plural quantities;

wherein determining the occurrence of a sudden event comprises analysing at least one quantity corresponding to frequency at each of plural different locations in the electrical power network and wherein the plural substantially synchronised quantities comprise a quantity corresponding to at least one of voltage phasers and current phasers received from the different locations in the electrical power network.

29. An electrical power network comprising at least one apparatus according to claim 28.

* * * * *